Nov. 7, 1933.    R. P. DIAZ    1,933,895
CAMERA
Filed March 12, 1932    2 Sheets-Sheet 1

Inventor
Reynaldo Plaza Diaz

Atty.

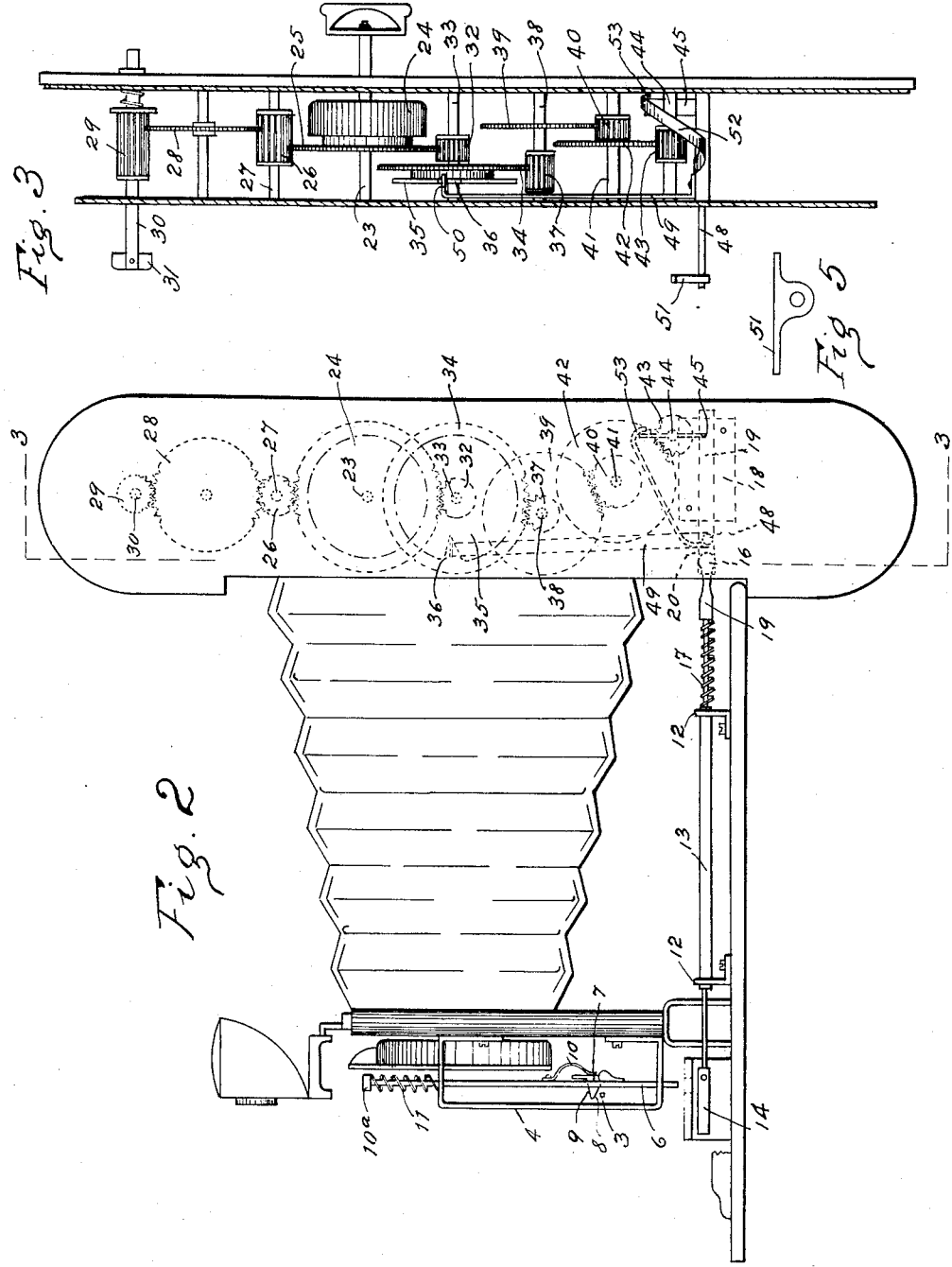

Patented Nov. 7, 1933

1,933,895

UNITED STATES PATENT OFFICE 1,933,895

CAMERA

Reynaldo Plaza Diaz, Habana, Cuba

Application March 12, 1932. Serial No. 598,513

7 Claims. (Cl. 95—32)

This invention relates to improvements in cameras, and primarily to means for automatically winding a film after exposure has been made.

The prime object of the invention is to provide automatic means controlled by the shutter actuating trigger arranged in such manner that when a film is exposed, automatic means is set and subsequently released, and the exposed portion of the film is wound upon its storage roll.

A further object of the invention is to provide articulated actuating mechanism between the shutter trigger and the means for automatically operating the film, whereby the actuating mechanism may be housed in the usual case, when the camera is folded.

The invention also comprehends improvements in the construction and arrangement of parts which will be hereinafter described and particularly pointed out in the claims.

In the accompanying drawings:—

Figure 2 is a side elevation of the same.

Figure 3 is a section on the line 3—3 of Fig. 2.

Figure 5 is a detail view of a lever for actuating the automatic mechanism.

Figure 1:
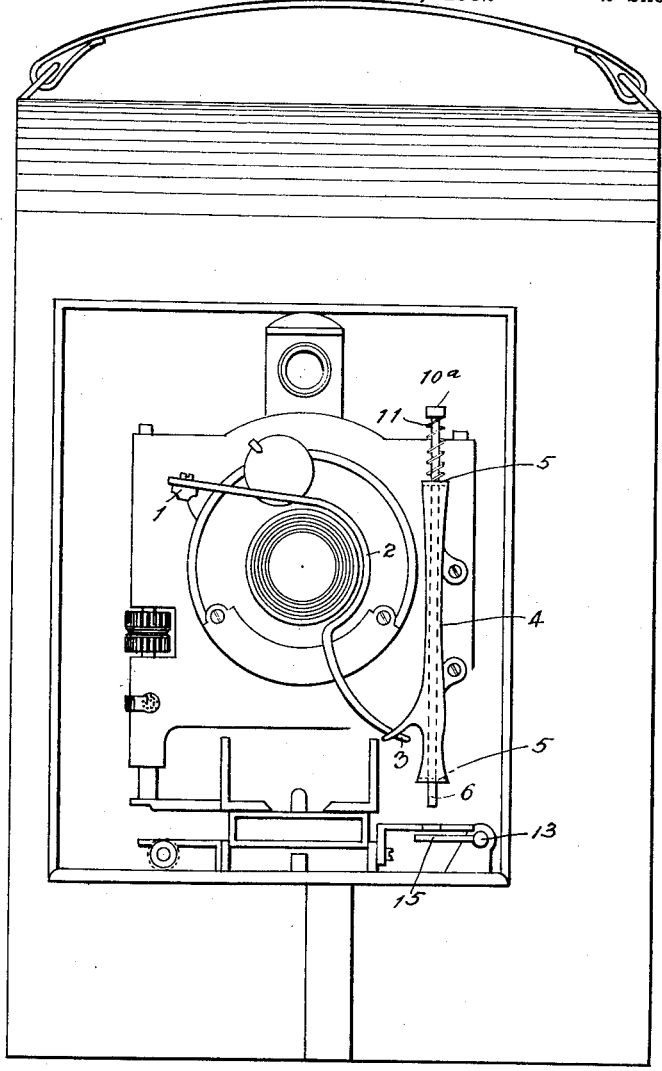
Figure 1 is a front elevation of a camera, illustrating the application of the invention, the camera mechanism being somewhat diagrammatically shown.
Figure 4:
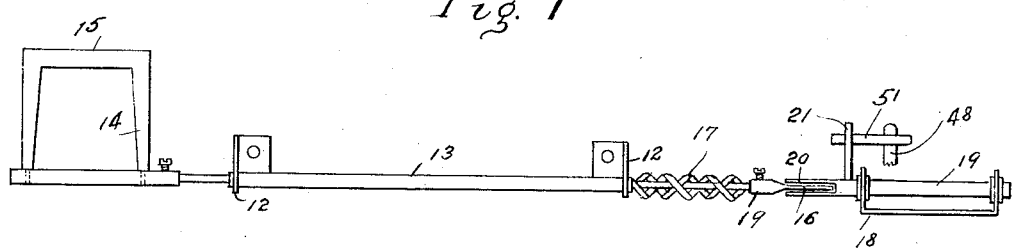
Figure 4 is a detail plan view of the articulated connection employed between the camera trigger and the automatic mechanism.

1 indicates the button or trigger for operating the usual shutter on a camera. This trigger is formed with an extension 2 terminating in a curved, depending nose 3.

Mounted on the front of the camera is a frame 4 formed with aligned openings 5—5 to receive a rod 6. Pivoted to a lug on the rod 6 is a cam 7 provided with a beveled edge 8, and a substantially horizontal upper surface 9, a spring 10 serving to normally set the cam in operative position. The upper end of the rod is formed with a head 10a, between which and the top of the frame 4 is a spring 11 to normally elevate the rod.

On the hinged front of the camera frame, and mounted in bearings 12—12, is an articulated shaft 13. To the forward end of this shaft is secured a laterally extending U-shaped bar 14, the cross bar 15 of which is located directly under the lower end of the rod 6. The inner end of the shaft 13 is flattened, as at 16, and between this flattened end and one of the bearings 5 is a spring 17 mounted so as to normally hold the rod in operative relation. The spring 17 is tensioned in the operation of the shaft 13 and serves to return the shaft to normal position when the operating pressure is released.

The usual camera casing is extended to house the automatic mechanism forming one of the essential features of this invention. On the inside of the casing is a bearing 18, and mounted therein in alignment with the shaft 13 is a short shaft 19 having a recess 20 in its forward end to receive the flattened end of the shaft 13. Extending inwardly from the short shaft 19 is a lateral lug 21, the purpose of which will be explained later on.

In the walls of the casing is mounted a shaft 23 carrying a motor spring 24, and a gear wheel 25 which meshes with a pinion 26 mounted on a shaft 27. Meshing with pinion 26 is a gear 28 which meshes with a pinion 29 on a sliding film winding shaft 30, having a flat end 31 to engage the usual slot formed in the end of a roll winding shaft.

The gear wheel 25 meshes with a pinion 32 on a shaft 33 which also carries a gear wheel 34 and a disk 35, the latter having a notch 36 formed in its periphery. The gear wheel 34 meshes with a pinion 37 on a shaft 38, which also carries a gear wheel 39, the latter meshing with a pinion 40 on a shaft 41 carrying a gear wheel 42 meshing with a pinion 43 on a shaft 44. On the shaft 44 is a cross bar 45 which acts as a fly wheel in the operation of the mechanism.

Secured to and extending upwardly from a shaft 48 mounted in the casing is a latch lever 49, the extreme end of which is bent at right angles to form a projection 50 to cooperate with the notch 36 in the disk 35. On the outer end of shaft 48 is a trip lever 51 which lies in the path of the lug 21, which extends inwardly from the short shaft 19. Secured to shaft 48 is a second latch lever 52, the end of which is bent downwardly at 53 to be in the path of movement of the cross bar 45 on shaft 44 to engage and hold same against movement when the parts are in normal position.

In operation, assuming the camera is in open position, and it is desired to make a picture, the trigger 1 is depressed to operate the shutter, as usual in a camera of this type. Depressing the trigger raises the lower end of the extension and the nose 3 rides up the edge 8 and rocks the cam until the top surface is past, then spring 10 returns the cam to its normal position. When the trigger returns to its normal position, the nose 3 engages the top surface 9 of the cam and depresses rod 6, the nose in its arcuate movement eventually riding off the cam. When the trigger is returned to normal position, the nose 3 engages the top of the cam and depresses the rod 6, and the latter in turn engages the bar 15 of the U-shaped bar and rocks the articulated shaft 13. When this shaft is tilted, the lateral lug 21 on the short shaft 19 engages the trip lever 51 and rocks shaft 48.

Rocking of shaft 48 disengages the bent end 50 of latch lever 49 from notch 36 and simultaneously disengages the bent end 53 of latch lever 52 from cross bar 45 on shaft 44. This frees the motor, and through the train of gears, shaft 30 is rotated and the exposed portion of the film is automatically wound on its roll. Of course, the motor mechanism is so arranged and timed that one revolution of the disk 35 and cross bar 45 will wind a stretch of film equal to the portion exposed. When the exposed portion of the film is wound on the roll, the latch levers engage the notch 36 and the bar 45 and stop the mechanism. During the period of winding the film, the articulated shaft 13 is free of the nose 3 of the trigger and the trip lever 51, and consequently the spring 17, will act to return said shaft to its normal position.

When the hinged support carrying the forward part of the camera is folded, the flattened end 16 of the shaft 13 plays in the recess 20 in the short shaft 19, thus maintaining the proper relationship of parts when the camera is in open or closed position.

I claim:—

1. A camera comprising shutter operating mechanism including a trigger having an extension with its end formed with a nose, a film winding shaft, motor mechanism for operating said shaft including a revolving cross bar and a disk with a notch therein, a latch shaft, a latch on the latch shaft to cooperate with the notch, a second latch on the latch shaft to cooperate with the revolving cross bar, a lever on the latch shaft, a tiltable shaft having a lateral lug adapted to engage the lever on the latch shaft, a projection on the tiltable shaft, a rod located in alignment with the projection, and a cam on the rod with which the nose cooperates to tilt the shaft and release the latches when exposing a film.

2. A folding camera including a casing and shutter operating mechanism, a motor, a film winding shaft operated by the motor, a latch shaft, a latch extending from the latch shaft, a lever on the latch shaft, an articulated shaft comprising two sections, one having a flattened end to engage in a slot formed in the companion section, a lug extending from the articulated shaft to engage the lever on the latch shaft, and means between the articulated shaft and the shutter mechanism for tilting said articulated shaft to release the latch and operate the motor to wind the film after exposure of the film.

3. A camera comprising shutter operating mechanism including a trigger having an operating nose, a rod, a cam pivoted to the rod and located adjacent the nose of the trigger, said cam having an inclined surface and a flat surface, a spring for normally holding the rod in elevated position, a motor including a latch and a film winding shaft, and means between the motor and the rod to release the latch when the shutter operated mechanism is actuated, the nose of the trigger riding on the inclined edge of the cam and on the flat surface when said mechanism is operated in one direction and when operated in the opposite direction depressing the rod to release the motor.

4. A folding camera including a casing and shutter operating mechanism, a motor, a film winding shaft operated by the motor, a latch shaft, a latch extending from the latch shaft, a lever on the latch shaft, an articulated shaft comprising two sections, one having a flattened end to engage in a slot formed in the companion section, a lug extending from the articulated shaft to engage the lever on the latch shaft, means between the articulated shaft and the shutter mechanism for tilting said articulated shaft to release the latch and operate the motor to wind the film after exposure of the film, and means for holding the articulated shaft in operative position.

5. A folding camera including a casing and shutter operating mechanism, a motor, a film winding shaft operated by the motor, a latch shaft, a latch extending from the latch shaft, a lever on the latch shaft, an articulated shaft comprising two sections, one having a flattened end to engage in a slot formed in the companion section, a lug extending from the articulated shaft to engage the lever on the latch shaft, means between the articulated shaft and the shutter mechanism for tilting said articulated shaft to release the latch and operate the motor to wind the film after exposure of the film, and a spring for holding the articulated shaft in operative position.

6. A folding camera including a casing and shutter operating mechanism, a motor in said casing, a film winding shaft in said casing and operated by the motor, a support for said shutter operating mechanism hinged to said casing and adapted to be pivotally moved to a position at right angles to the casing, an articulated rod carried by said support and extending into said casing, said rod releasing the motor upon movement of the shutter operating mechanism, the articulation of the rod providing that a portion of the rod may be swung into the casing upon closing of the camera.

7. A folding camera according to claim 6, wherein the rod is formed of two parts pivotally connected together.

REYNALDO PLAZA DIAZ.